United States Patent
Wi et al.

(10) Patent No.: US 9,432,888 B2
(45) Date of Patent: Aug. 30, 2016

(54) METHOD FOR SECURING HANDOVER DATA INTEGRITY IN MOBILE COMMUNICATION SYSTEM AND SYSTEM THEREOF

(75) Inventors: Mi-ae Wi, Seongnam-si (KR);
Kyung-jin Kim, Seongnam-si (KR);
Bong-joo Kim, Ansan-si (KR);
Jun-hwan Oh, Seongnam-si (KR);
Gyou-hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 13/509,406

(22) PCT Filed: Nov. 15, 2010

(86) PCT No.: PCT/KR2010/008053
§ 371 (c)(1),
(2), (4) Date: Nov. 20, 2012

(87) PCT Pub. No.: WO2011/059284
PCT Pub. Date: May 19, 2011

(65) Prior Publication Data
US 2013/0170477 A1    Jul. 4, 2013

(30) Foreign Application Priority Data
Nov. 13, 2009    (KR) ................. 10-2009-0109990

(51) Int. Cl.
*H04W 36/00*    (2009.01)
*H04W 36/02*    (2009.01)

(52) U.S. Cl.
CPC ......... *H04W 36/0077* (2013.01); *H04W 36/02* (2013.01)

(58) Field of Classification Search
CPC  H04W 72/0446; H04W 84/12; H04W 84/18
USPC .................................. 370/336, 329, 310
See application file for complete search history.

(56) References Cited

U.S. PATENT DOCUMENTS

| | | | |
|---|---|---|---|
| 8,311,010 B1 * | 11/2012 | Qian | H04L 47/20 370/331 |
| 2010/0098247 A1 * | 4/2010 | Suumaki | 380/44 |
| 2010/0151862 A1 * | 6/2010 | Park | H04W 36/0083 455/436 |
| 2013/0170477 A1 * | 7/2013 | Wi | H04W 36/0077 370/336 |

FOREIGN PATENT DOCUMENTS

| | | |
|---|---|---|
| EP | 1 507 422 A1 | 2/2005 |
| EP | 1 912 403 A1 | 4/2008 |
| KR | 10-2009-0055921 A | 6/2009 |

* cited by examiner

*Primary Examiner* — Andrew Lai
*Assistant Examiner* — Zhiren Qin
(74) *Attorney, Agent, or Firm* — Jefferson IP Law, LLP

(57) ABSTRACT

A method of performing an uncontrolled handover data integrity of a target Base Station (BS) is provided. The method includes receiving an initial access request message from a Mobile Station (MS) by the target BS, performing a negotiation for establishing a handover data integrity path with a serving BS through a serving Access Service Network-Gateway (ASN-GW) by the target BS, and generating a main data path and a first handover data integrity path with the serving ASN-GW according to a result of the negotiation by the target BS.

24 Claims, 5 Drawing Sheets

METHOD FOR SECURING HANDOVER DATA INTEGRITY IN MOBILE COMMUNICATION SYSTEM AND SYSTEM THEREOF

PRIORITY

This application is a National Stage application under 35 U.S.C. §371 of an International application filed on Nov. 15, 2010 and assigned application No. PCT/KR2010/008053, and claims the benefit under 35 U.S.C. §365(b) of a Korean patent application filed on Nov. 13, 2009 in the Korean Intellectual Property Office and assigned application No. 10-2009-0109990, the entire disclosure of which is hereby incorporated by reference.

1. Field of the Invention

The present invention relates to a handover in a mobile communication system. More particularly, the present invention relates to a method and a system for securing data integrity during handover.

2. Description of the Related Art

In general, mobile communication systems enable users to perform a communication without being restricted by their location or a wired connection. The mobile communication systems were initially developed in order to provide a voice service. More recently, the mobile communication systems are being developed in order to provide various additional services discriminated from the voice service. That is, services provided by the mobile communication systems are becoming more diversified, and thus high speed transmission of a large amount of data has become a hot issue in current discussions. Moreover, the recent increase in the users' demands for various large capacity multimedia services has caused the current trend of establishing wideband wireless access networks.

Representative technologies for the wideband wireless access networks include the Worldwide Interoperability for Microwave Access (WiMAX) technology. The WiMAX technology is a wireless access technology, which has overcome the disadvantages of the conventional wireless Local Area Network (LAN), which has a short electric wave reaching distance and thus has a narrow coverage and is unable to support the mobility or secure the Quality of Service (QoS), or the existing mobile communication systems, which use limited wireless resources and thus have high system operation costs. The WiMAX technology enables high speed access to the Internet in a stationary or mobile environment, thereby enabling use of various types of information or contents. Since the WiMAX technology supports mobility and secures a high speed data transmission, a securing of the service quality is the most important issue in the WiMAX technology.

Technologies for securing the service quality include handover, which prevents interruption of a communication of a Mobile Station (MS) even when the MS moves from an area of an existing Base Station (BS) to an area of another BS during the communication. However, during the movement of the MS from the area of the existing BS to the area of another BS, data to be transmitted to the MS may be lost.

SUMMARY OF THE INVENTION

Aspects of the present invention are to address at least the above-mentioned problems and/or disadvantages and to provide at least the advantages described below. Accordingly, an aspect of the present invention is to provide a method and a system for securing data integrity during a handover in a mobile communication system.

Another aspect of the present invention is to provide a method and a system for securing data integrity when a non-control handover occurs in a mobile communication system.

In accordance with an aspect of the present invention, a method of performing an uncontrolled handover data integrity of a target Base Station (BS) is provided. The method includes receiving an initial access request message from a Mobile Station (MS) by the target BS, performing a negotiation for establishing a handover data integrity path with a serving BS through a serving Access Service Network-Gateway (ASN-GW) by the target BS, and generating a main data path and a first handover data integrity path with the serving ASN-GW according to a result of the negotiation by the target BS.

According to another aspect of the present invention, a method of performing an uncontrolled handover data integrity of a serving BS is provided. The method includes performing a negotiation for establishing a handover data integrity path with a target BS through a serving ASN-GW by the serving BS, and generating a second handover data integrity path with the serving ASN-GW according to a result of the negotiation by the serving BS.

According to the present invention, it is possible to secure handover integrity during an uncontrolled handover in a mobile communication system, thereby preventing a data loss, which may occur due to the handover.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
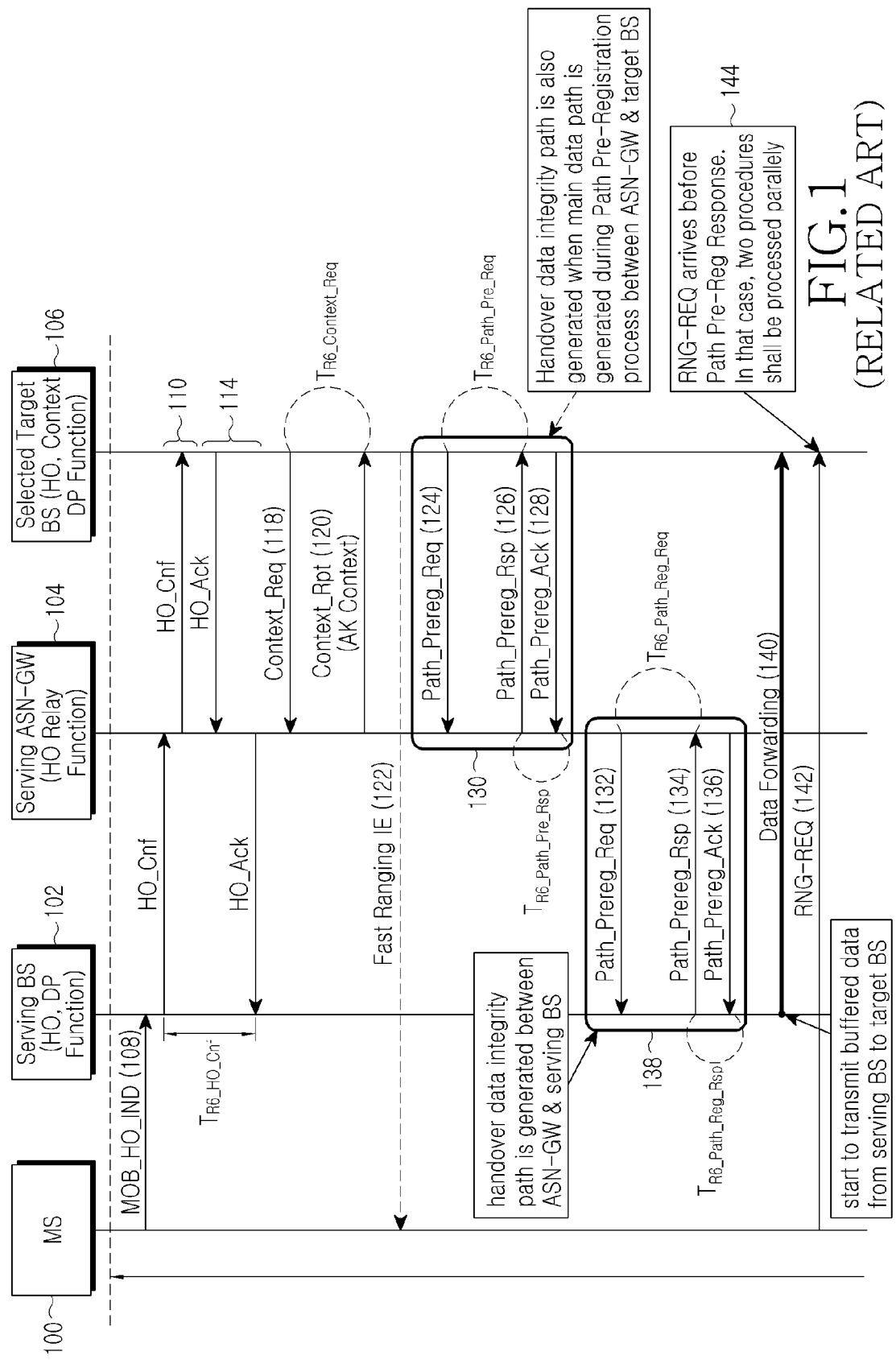
FIGS. 1 and 2 are signal flow diagrams for describing a handover data integrity process of a controlled handover scheme in a WiMAX according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In general, a mobile communication system having multiple cells supports a handover in order to provide an uninterrupted service to a Mobile Station (MS) even when the MS moves from a serving Base Station (BS), which is a BS that provides service to the MS before the handover, to a target BS, which is a BS that provides service to the MS after the handover.

In the mobile communication system as described above, during a handover, data, which should be transferred from a serving BS to an MS during movement of the MS to a target BS, may be accumulated in the serving BS without being transferred to the MS, which causes a data loss. At this time, a handover data integrity path may be established between the serving BS and the target BS so that the data buffered in the serving BS without being transferred from the serving BS to the MS can be forwarded from the serving BS to the target BS, so as to minimize the data loss during the handover, which corresponds to a handover data integrity function.

Hereinafter, exemplary methods and systems for providing data integrity during a handover in a mobile communication system based on the Worldwide Interoperability for Microwave Access (WiMAX) technology will be described. However, it is to be understood that the following description using the WiMAX technology is only an example and the present invention can be applied to other mobile communication systems, such as a Wireless Broadband (Wibro) system or a Third Generation (3G) Long Term Evolution (LTE) system.

The current Wibro technology and WiMAX Forum Networking Working Group (WiMAX NWG) are developing a network structure for providing a wireless Internet service of an MS based on the Institute of Electrical and Electronics Engineers (IEEE) 802.16 standards and arranging standards for the network structure, and define a handover process in order to maintain data transmission/reception when an MS leaves an area of a currently-accessing BS and enters an area of another BS. Among the standards, NWG DRAFT-T33-001-R015v01-0, which is a WiMAX NWG standard, clearly defines that the handover data integrity is supported only in the case of a controlled handover.

Hereinafter, a method of supporting handover data integrity in the case of a controlled handover will be described with reference to FIGS. 1 and 2.

Figure 2:
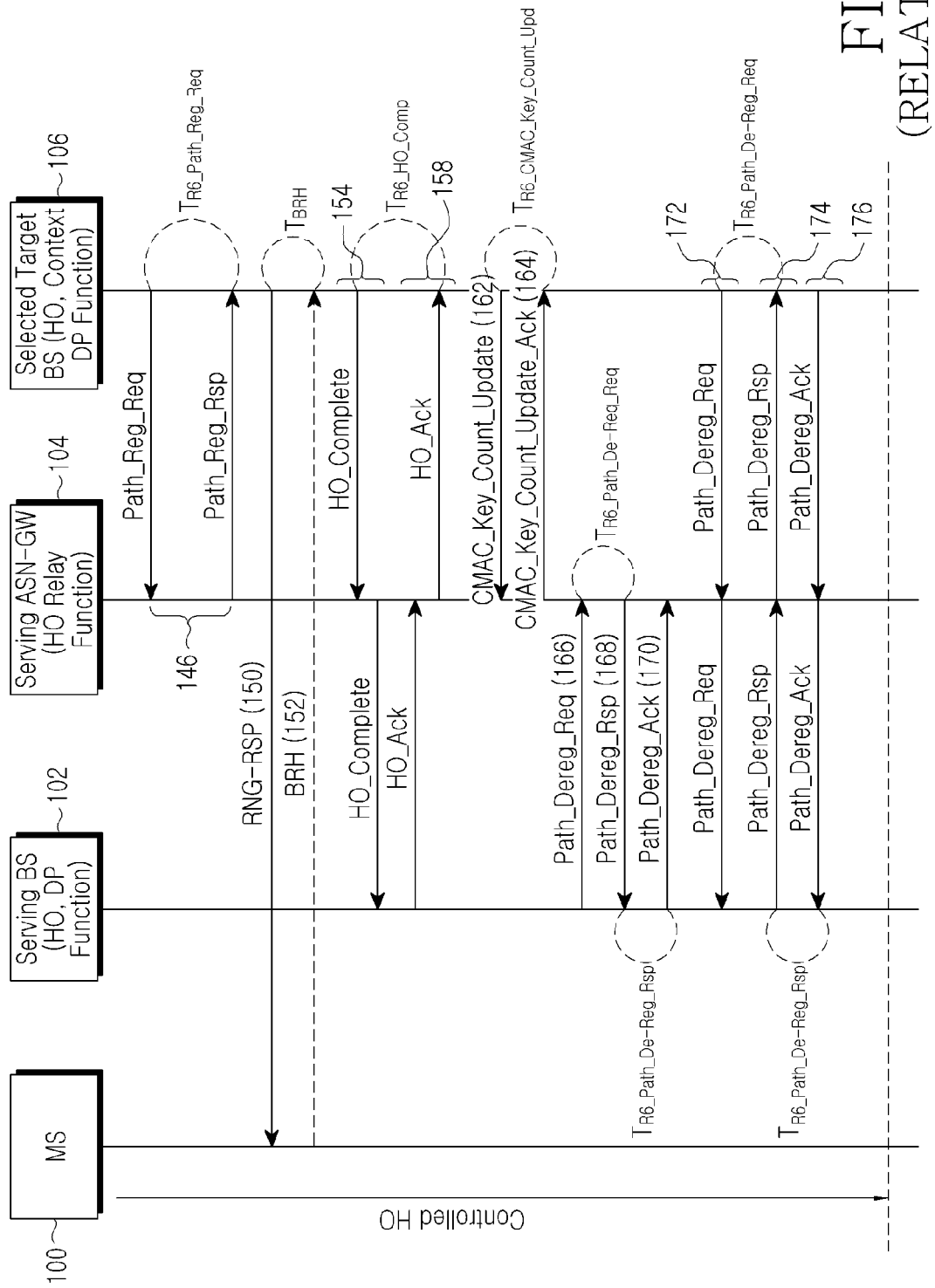

FIGS. 1 and 2 are signal flow diagrams for describing a handover data integrity process of a controlled handover scheme in a WiMAX according to the related art.

FIGS. 1 and 2 show a signaling flow between an MS 100, a serving BS 102, which currently provides a service to the MS 100 and performs processes related to the handover and data path, a serving Access Service Network-Gateway (ASN-GW) 104 for performing a handover relay function, and a target BS 106, to which the MS 100 will handover, and which performs processes related to the handover, context, and data path. Notably, the terms described herein can be used based on the Wibro, WiMAX, or IEEE 802.16 standards.

Referring to FIG. 1, when a handover of the MS 100 from the serving BS 102 to the target BS 106 occurs, the MS 100 transmits a Mobile Station Handover Indication (MOB_HO_IND) message, which indicates a handover to the target BS 106, to the serving BS 102 in step 108. The serving BS 102 transmits a Handover Confirm (HO_Cnf) message, which indicates that the MS 100 will handover, to the target BS 106 through the serving ASN-GW 104 in step 110. Upon receiving the HO_Cnf message, the target BS 106 transmits a Handover Acknowledgement (HO_Ack) message to the serving BS 102 through the serving ASN-GW 104 in step 114.

The target BS 106 transmits a Context Request (Context_Req) message to the serving ASN-GW 104 in step 118, and the serving ASN-GW 104 transmits a Context Report (Context_Rpt) message to the target BS 106 in response to the Context_Req message in step 120.

Further, in step 122, the target BS 106 transmits a fast ranging Information Element (IE) to the MS 100.

In step 124, the target BS 106 transmits a Path Pre-Registration Request (Path_Prereg_Req) message to the serving ASN-GW 104, and the serving ASN-GW 104 transmits the Path Pre-Registration Response (Path_Prereg_Rsp) message to the target BS 106 in response to the Path_Prereg_Req message in step 126. Thereafter, the target BS 106 transmits a Path Pre-Registration Acknowledgment (Path_Prereg_Ack) message to the serving ASN-GW 104 in step 128. Steps 124 to 128 can be grouped into a step indicated by reference numeral 130. In the Path Pre-Registration process between the serving ASN-GW 104 and the target BS 106 as in step 130, a handover data integrity path (i.e., a switching data path) is also generated when a main data path is generated.

After the Path Pre-Registration process between the serving ASN-GW 104 and the target BS 106 is performed in step 130, a handover data integrity path (i.e., a switching data path) as in the step indicated by reference numeral 138 is generated between the serving ASN-GW 104 and the serving BS 102. Step 138 includes step 132 in which the serving ASN-GW 104 transmits a Path_Prereg_Req message to the serving BS 102, step 134 in which the serving BS 102 transmits a Path_Prereg_Rsp message as a response to the serving ASN-GW 104, and step 136 in which the serving ASN-GW 104 transmits a Path_Prereg_Ack message to the serving BS 102. After step 138, since a handover data integrity path has been generated between the serving ASN-GW 104 and the serving BS 102, the serving BS 102 transmits buffered data to the target BS 106 in step 140.

In step 142, the MS 100 transmits a Ranging Request (RNG-REQ) message to the target BS 106. The RNG-REQ message is a message transmitted to the BS 106 by the MS 100 for an uplink access in a WiMAX system. When the RNG-REQ message is received before the Path_Prereg_Rsp message, step 130 and a step of exchanging an RNG-REQ message and a Ranging Response (RNG-RSP) message can be performed in parallel in step 144.

In step 146, the target BS 106 and the serving ASN-GW 104 exchange a Path_Reg_Req message and a Path_Reg_Rsp message, so as to establish a data path for exchanging the Service Flow (SF).

The difference between step 130 and step 146 lies in that step 130 is a preparation step for generation of a data path between the serving ASN-GW 104 and the target BS 106, since it is before the MS 100 transmits a RNG-REQ message to the target BS 106, while step 146 is a step in which the data path is completely generated since the target BS 106 has received the RNG-REQ message from the MS 100 and it is clear that the MS 100 will move to the target BS 106.

Further, the target BS 106 transmits a RNG-RSP message as a response to the RNG-REQ message to the MS 100 in step 150, and the MS 100 having received the RNG-RSP message transmits a Bandwidth Request Header (BRH) message to the target BS 106 in step 152. The target BS 106 transmits a Handover Complete (HO_Complete) message to the serving BS 102 through the serving ASN-GW 104 in step 154, and the serving BS 102 transmits a Handover Acknowledgment (HO_Ack) message to the target BS 106 through the serving ASN-GW 104 in step 158.

Upon receiving the HO_Ack message, the target BS 106 transmits a CMAC_Key_Count_Update message to the serving ASN-GW 104 in step 162, and the serving ASN-GW 104 transmits a CMAC_Key_Count_Update_Ack message as a response to the target BS 106 in step 164.

The serving BS 102 deregisters the data path established between the serving BS 102 and the serving ASN-GW 104 in steps 166, 168, and 170. First, the serving BS 102 transmits a Path Deregistration Request (Path_Dereg_Req) message to the serving ASN-GW 104 in step 166, and the serving ASN-GW 104 transmits a Path Deregistration Response (Path_Dereg_Rsp) message to the serving BS 102 in step 168. Finally, in step 170, the serving BS 102 transmits a Path Deregistration Acknowledgment (Path_Dereg_Ack) message to the serving ASN-GW 104, thereby completing the data path deregistration process.

Thereafter, in order to deregister the handover data integrity path established between the target BS 106 and the serving BS 102, the target BS 106 transmits a Path_Dereg_Req message to the serving BS 102 through the serving ASN-GW 104 in step 172, the serving BS 102 transmits a Path_Dereg_Rsp message as a response to the target BS 106 in step 174, and the target BS 106 transmits a Path_Dereg_Ack message to the serving BS 102 through the serving ASN-GW 104 in step 176, thereby completing the handover data integrity path deregistration process.

In the case of the controlled handover described above with reference to FIGS. 1 and 2, when the MS 100 transmits a MOB_HO_IND message to the serving BS 102 and the serving BS 102 receives the MOB_HO_IND message, the process of securing a handover data integrity is started from the Path Pre-Registration step 130, which is a step for generating a main data path for data transmission and reception between the serving ASN-GW 104 and the target BS 106. In other words, when the handover begins, data not transmitted to the MS 100 is stored in the serving BS 102, and the serving ASN-GW 104 and the target BS 106 generate a main data path by exchanging Path_Prereg_Req/Rsp/Ack messages with each other. At the same time, a handover data integrity path (i.e., a switching data path) is also generated. As used herein, the handover data integrity path (i.e., a switching data path) refers to a path through which data stored in the serving BS 102, without being transferred to the MS 100, can be transferred to the target BS 106. Further, a data integrity path is generated between the serving ASN-GW 104 and the serving BS 102 through the Path Pre-Registration step 138. In step 140, the data buffered in the serving BS 102 is transferred to the target BS 106 through the handover data integrity path generated in steps 130 and 138, so as to prevent occurrence of data loss.

In the case of a controlled handover as shown in FIGS. 1 and 2, the handover data integrity process is started by generating a handover data integrity path in the Path Pre-Registration step. However, in the case of an uncontrolled handover, the handover indication (MOB_HO_IND) message may be lost in the air, and it becomes impossible to perform a Path Pre-Registration as in step 130 of FIG. 1 before the ranging process of the MS 100 for initial access to the target BS 106. Therefore, in the case of an uncontrolled handover, there is insufficient time available for the handover data integrity process, which prevents an efficient path establishment.

For this reason, the current WiMAX standards support a handover data integrity function for a controlled handover, but do not support a handover data integrity function for an uncontrolled handover, which causes a problem of service quality degradation. For example, in the case of the Transmission Control Protocol (TCP) optimized for a wired environment, if a system does not support a handover data integrity function when an uncontrolled handover occurs, the TCP window size is rapidly reduced, so that it may take a long time for restoration of the data rate before the handover.

Therefore, exemplary embodiments of the present invention described below with reference to FIGS. 3, 4, and 5 propose a method and system that can support a handover integrity function for an uncontrolled handover as well as a controlled handover, so as to transfer data buffered in a serving BS without a loss to an MS performing the handover so that the MS can complete the handover. Further, the term "Handover data integrity path" as used herein can be also referred to as a "switching data path."

First, as used herein, a controlled handover refers to a handover when a serving BS receives a MOB_HO_IND message from an MS, and an uncontrolled handover refers to a handover when a serving BS is unable to or otherwise does not receive a MOB_HO_IND message from an MS.

Figure 3:
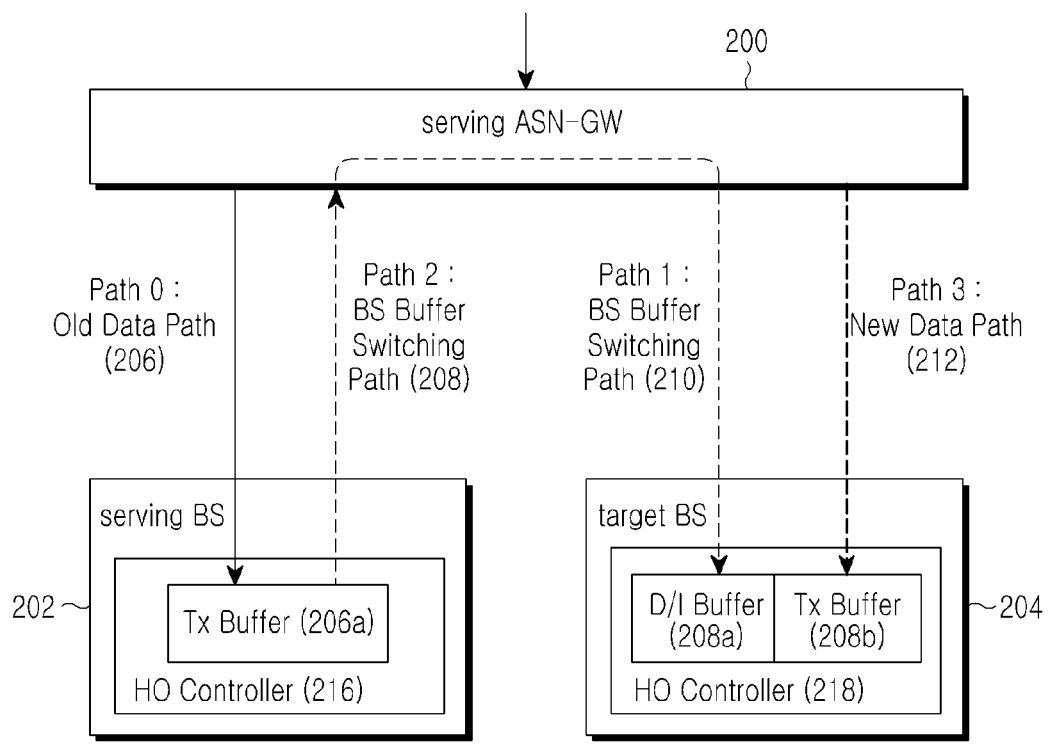
FIG. 3 is a block diagram illustrating a buffer switching scheme in a downlink for supporting a handover data integrity in a mobile communication system according to an exemplary embodiment of the present invention.

FIG. 3 is a block diagram illustrating a buffer switching scheme in a downlink for supporting a handover data integrity in a mobile communication system according to an exemplary embodiment of the present invention.

In the case of an uncontrolled handover, exemplary embodiments of the present invention use a buffer switching scheme in order to support a handover data integrity. According to the buffer switching scheme, in the case of an uncontrolled handover, after a handover data integrity path is formed between a serving ASN-GW 200 and a target BS 204 and between the serving ASN-GW 200 and a serving BS 202, the serving BS 202 transfers the buffered data, which is not completely transmitted yet, to the target BS 204.

Referring to FIG. 3, path #0 206 refers to an old data path originally existing between the serving ASN-GW 200 and the serving BS 202, and path #2 208 and path #1 210 refer to buffer switching paths, which are handover data integrity paths generated in order to provide a handover data integrity according to an exemplary embodiment of the present invention. Finally, path #3 212 refers to a data path newly generated when a handover of an MS to the target BS 204 occurs.

According to an exemplary embodiment of the present invention, in the downlink, the serving BS 202 transmits the data buffered in a transmission buffer 206a within a handover (HO) controller 216 to the serving ASN-GW 200 through path #2 208 (R6 data path), the serving ASN-GW 200 transmits the buffered data to the target BS 204 through path #1 210 (R4/R6 data path), and the target BS 204 stores the buffered data in a data integrity buffer (D/I buffer) 208a within the HO controller 218.

Further, the transmission buffer 208b of the target BS 204 corresponds to a buffer for storing data to be received through path #3 212 and transmitted to an MS.

Although FIG. 3 shows only an application of a buffer switching scheme according to an exemplary embodiment of the present invention to the downlink, the buffer switching scheme can be applied to the uplink. In the uplink, a scheme in which an uplink Service Data Unit (UL SDU) reassembly is performed in the target BS is considered. According to this scheme, a buffer switching is performed together with an Automatic Repeat Request (ARQ) and a buffer synchronization, wherein a serving BS transmits a remaining UL ARQ window to a target BS through a BS buffer switching scheme and the target BS receives and restores the ARQ window and reassembles SDUs by using an ARQ block received from the MS. Further, the BS buffer switching scheme can be applied to both the case of using an ARQ and the case of not using an ARQ.

The buffer switching scheme according to exemplary embodiments of the present invention is different from the other switching schemes in that the serving BS 202 participates in transmitting the data buffered in the transmission buffer 206a of the serving BS 202 to the target BS 204 through a BS buffer switching path. That is, in the other switching schemes, instead of the serving BS 202, the serving ASN-GW 200 participates in the transmission.

Figure 4:
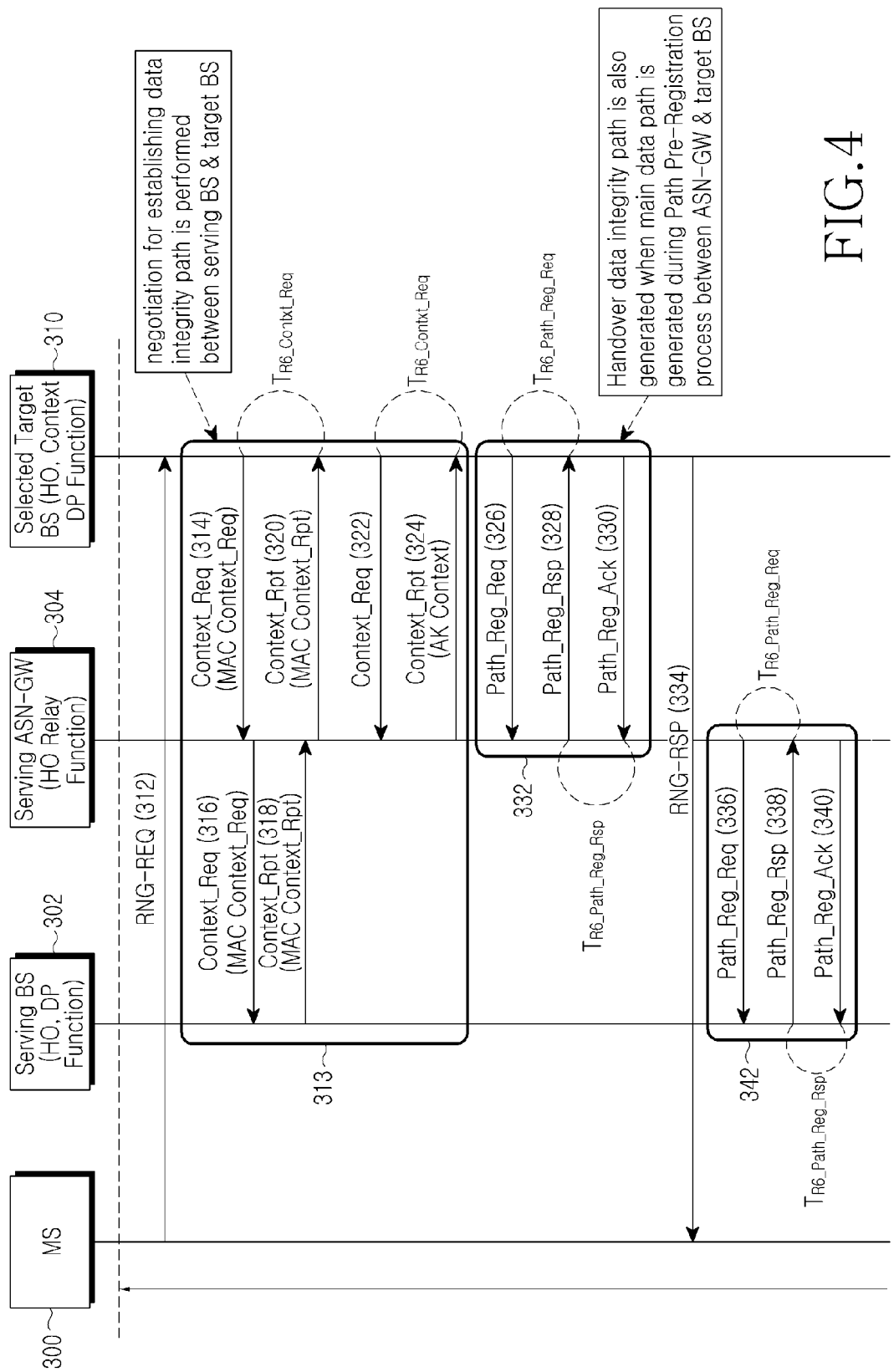
FIGS. 4 and 5 are signal flow diagrams illustrating a process for securing handover data integrity in an uncontrolled handover scheme according to an exemplary embodiment of the present invention.
Figure 5:
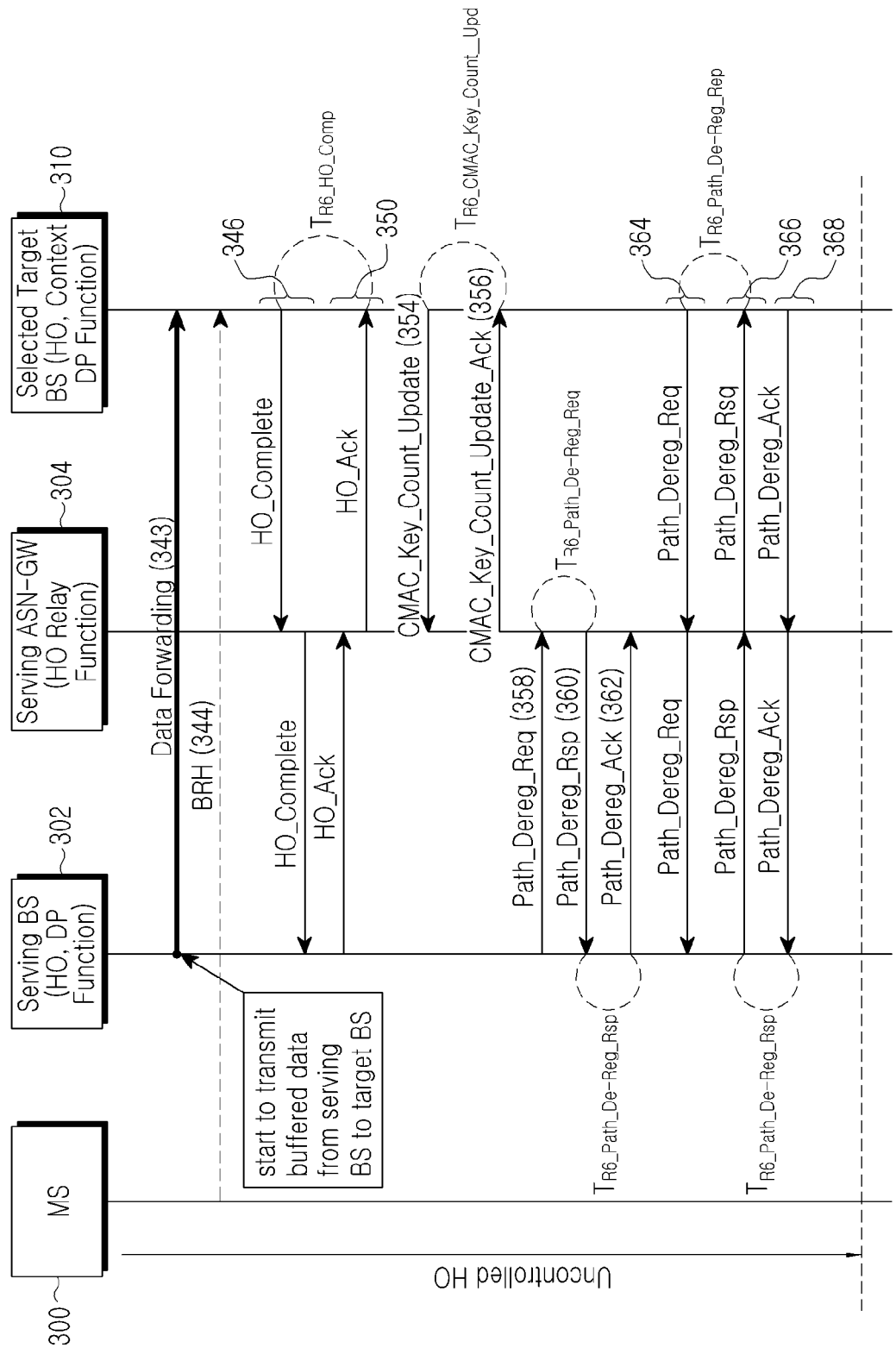

FIGS. 4 and 5 are signal flow diagrams illustrating a process for securing a handover data integrity in an uncontrolled handover scheme according to an exemplary embodiment of the present invention.

Before describing FIGS. 4 and 5, data integrity paths generated for securing a handover data integrity are defined as follows. First, a data integrity path generated between a serving ASN-GW 304 and a target BS 310 is defined as a first handover data integrity path, and a data integrity path generated between the serving ASN-GW 304 and a serving BS 302 is defined as a second handover data integrity path.

In step 312 of FIG. 4, an MS 300 transmits a message for accessing the target BS 310, to which the MS 300 will handover. In an exemplary implementation, the MS may transmit a RNG-REQ message as defined in the WiMAX communication system.

In step 313, the target BS 310 performs a negotiation process for setting a handover data integrity path with the serving BS 302 through the serving ASN-GW 304.

Through the negotiation process, whether to apply a handover data integrity process is determined. That is, a handover data integrity scheme is determined. Further, information necessary for providing a service to the MS 300 after the handover by the target BS 310 may be provided to the target BS 310. The necessary information may include, for example, information of the MS, ARQ state information of the current serving BS 302 about the MS 300, etc.

As an example of the negotiation, based on an assumption that handover data integrity methods supported by the current target BS 310 include data integrity methods A, B, and C, the target BS 310 transmits information on methods A, B, and C to the serving BS 302, the serving BS 302 transmits information on whether the serving BS 302 supports a handover data integrity process and information on the method or methods which the serving BS 302 supports (e.g., it is assumed that the serving BS 302 supports the methods of B and C), and the target BS 310 selects a method between the methods of B and C and sends a response reporting the selected method to the serving BS 302, thereby completing the negotiation. The response may be sent by either an explicit method or an implicit method. As an example of an implicit method, it may be determined in advance that reception or transmission of a message requesting the setting of an integrity path by itself should define a particular method (e.g., B). In contrast, when the target BS 310 wants to use A other than B or C, the target BS 310 may send a response indicating that it will not perform a handover integrity process. The response indicating that the target BS 310 will not perform a handover integrity process can also be performed in either an explicit method or an implicit method.

Meanwhile, through the negotiation, the serving BS 302 may transmit information on the MS 300, ARQ state information of the current serving BS 302 about the MS 300, etc., to the target BS 310.

Now, a specific example of the negotiation process will be described with reference to step 313 including steps 314 to 324 in FIG. 4.

Upon receiving the RNG-REQ message, the target BS 310 transmits a context request (Context_Req or MAC Context_Req) message to the serving ASN-GW 304 in step 314. Upon receiving the context request (e.g., MAC Context_Req) message from the target BS 310, the serving ASN-GW 304 transmits the received MAC Context_Req message to the serving BS 302 in step 316. The MAC Context_Req message includes information of a handover data integrity method supported by the target BS 310. That is, in the example described above, the MAC Context_Req message includes information on the methods of A, B, and C.

Upon receiving the MAC Context_Req message in step 316, the serving BS 302 transmits a context report (Context_Rpt or MAC Context_Rpt) message as a response to the serving ASN-GW 304 in step 318. In step 320, the serving ASN-GW 304 transfers the received context report (e.g., MAC Context_Rpt) message to the target BS 310. The MAC Context_Rpt message includes information on whether the serving BS 302 supports a handover data integrity process, and information on the method or methods which the serving BS 302 supports (e.g., it is assumed that the serving BS 302 supports the methods of B and C). Thereafter, the target BS 310 determines a method for supporting a handover data integrity by using the information on the method or methods which the target BS 310 supports and the information on the method or methods which the serving BS 302 supports.

Through steps 314 to 320, the target BS 310 acquires a Medium Access Control (MAC) context of the MS 300. The context request/report messages transmitted or received in steps 314 to 320 are context messages transmitted or received by the target BS 310 in order to acquire MS-related information, which is required to provide a service to the MS 300 by the target BS 310, from the serving BS 302.

In step 322, the target BS 310 transmits a Context_Req message to the serving ASN-GW 304, and the serving ASN-GW 304 transmits a Context_Rpt or MAC Context_Rpt message as a response to the target BS 310 in step 324. In this step, an Authentication Key (AK) context is transmitted from the serving ASN-GW 304 to the target BS 310.

After completing the exchange of context messages, the target BS 310 transmits a Path_Reg_Req message to the serving ASN-GW 304 in order to generate a data path between the serving ASN-GW 304 and the target BS 310 in step 326, and the serving ASN-GW 304 transmits a Path_Reg_Rsp message as a response to the target BS 310 in step 328. Upon receiving the Path_Reg_Rsp message, the target BS 310 transmits a Path_Reg_Ack message to the serving ASN-GW 304 in step 330. In the path registration process between the serving ASN-GW 304 and the target BS 310 through steps 326 to 330, when a main path (path #3 212 of FIG. 3) is generated, a handover data integrity path (path #1 210 of FIG. 3) is also generated.

After the path registration process between the serving ASN-GW 304 and the target BS 310 is completed as in step 332, the target BS 310 transmits a RNG-RSP message as a response to the RNG-REQ message received in step 312 to the MS 300 in step 334.

In order to establish a handover data integrity path between the serving ASN-GW 304 and the serving BS 302, the serving ASN-GW 304 transmits a Path_Reg_Req message to the serving BS 302 in step 336, and the serving BS 302 transmits a Path_Reg_Rsp message as a response to the serving ASN-GW 304 in step 338. Upon receiving the Path_Reg_Rsp message, the serving ASN-GW 304 transmits a Path_Reg_Ack message to the serving BS 302 in step 340. Through step 342 including steps 336 to 340, a handover data integrity path between the serving ASN-GW 304 and the serving BS 302 is established. Meanwhile, through steps 336 and 338, the serving BS 302 can understand the method, which the target BS 310 has determined in order to support a handover data integrity, in an explicit method or an implicit method. As an example of an implicit method, it may be determined in advance that the reception of the Path_Reg_Req message itself should imply the use of a buffer switching scheme for supporting a handover data integrity.

After the path registration process between the serving BS 302 and the target BS 310 is completed through steps 332 and 342, the serving BS 302 transfers the data buffered in the serving BS 302 to the target BS 310 in step 343. Thereafter, the MS 300 transmits a BRH message to the target BS 310 in step 344.

The target BS 310 transmits an HO_Complete message to the serving BS 302 through the serving ASN-GW 304 in step 346, and the serving BS 302 transmits an HO_Ack message to the target BS 310 through the serving ASN-GW 304 in step 350.

Upon receiving the HO_Ack message, the target BS 310 transmits a CMAC_Key_Count_Update message to the serving ASN-GW 304 in step 354, and the serving ASN-GW 304 transmits a CMAC_Key_Count_Update_Ack message as a response to the target BS 310 in step 356.

The serving BS 302 deregisters the data path established between the serving BS 302 and the serving ASN-GW 304 in steps 358, 360, and 362. First, the serving BS 302 transmits a Path_Dereg_Req message to the serving ASN-GW 304 in step 358, and the serving ASN-GW 304 transmits a Path_Dereg_Rsp message to the serving BS 302 in step 360. Finally, in step 362, the serving BS 302 transmits a Path_Dereg_Ack message to the serving ASN-GW 304, thereby completing the data path deregistration process.

Thereafter, in order to deregister the handover data integrity path established between the target BS 310 and the serving BS 302, the target BS 310 transmits a Path_Dereg_Req message to the serving BS 302 through the serving ASN-GW 304 in step 364, the serving BS 302 transmits a Path_Dereg_Rsp message as a response to the target BS 310 in step 366, and the target BS 310 transmits a Path_Dereg_Ack message to the serving BS 302 through the serving ASN-GW 304 in step 368, thereby completing the handover data integrity path deregistration process.

FIGS. 4 and 5 illustrate a process for securing a handover data integrity in an uncontrolled handover scheme according to an exemplary embodiment of the present invention as described above. Referring to FIGS. 4 and 5, the time point at which a handover data integrity path is generated between the target BS 310 and the serving ASN-GW 304 corresponds to the path registration step indicated by reference numeral 332. That is, in order to generate a main data path (path #3 212 of FIG. 3), the target BS 310 and the serving ASN-GW 304 exchange the Path_Reg_Req/Rsp/Ack messages, at which the handover data integrity path (path #1 210 of FIG. 3) is also generated. Here, the main data path 212 refers to a data path necessary for transmission and reception of data after the handover to the target BS 310, other than the transmission or reception of the data buffered in the serving BS 302 during the handover between the serving ASN-GW 304 and the target BS 310.

Thereafter, through step 342 of FIG. 4, the serving BS 302 and the serving ASN-GW 304 also exchange the Path_Reg_Req/Rsp/Ack messages, so as to generate a handover data integrity path (path #2 208 of FIG. 3), thereby establishing a path through which the serving BS 302 can transfer the data buffered in the serving BS 302 to the target BS 310. Further, in step 343 of FIG. 4, the data buffered in the serving BS 302 is transmitted to the serving ASN-GW 304, and the serving ASN-GW 304 forwards the received data to the target BS 310.

Hereinafter, information in the form of Type Length Value (TLV) to be added to messages for a handover data integrity function according to an exemplary embodiment of the present invention will be described.

First, TLVs to be added to messages according to an exemplary embodiment of the present invention include elements as shown in Table 1 below.

TABLE 1

| | TLV | Message |
|---|---|---|
| Negotiation process | Data Integrity Applied | Added to MS info > SF info TLV within MAC Context_Req message |
| | Data Integrity Capability & Data Integrity Method (1) | Added to BS info TLV having information on target BS within MAC Context_Req message |
| | Data Integrity Method (2) | Added to SF info TLV within MAC Context_Rpt message |
| ARQ scheme | ARQ Window Info | Added to MAC Context_Rpt message |
| | Switching Data Path ID | Added to Path_Reg_Rsp message |
| Non ARQ scheme | SDU SN (SDU Sequence Number) | Added to SDU info TLV within MAC Context_Rpt message |

In the negotiation process, whether a handover data integrity process should be performed, and the method in which the handover data integrity process will be performed if it should be performed are determined. In Table 1, the "Data Integrity Applied?" information corresponds to information necessary in order to determine whether to support a handover data integrity for each service flow, and has a TLV form. The TLV may be included in the form as shown in Table 2 below in the MAC Context_Req message transmitted in steps 314 and 316.

TABLE 2

| IE |
| --- |
| SF Info<br>> Data Integrity Applied |

That is, the Data Integrity Applied? information may be included as a sub-TLV of a Service Flow Information (SFI) TLV of a MAC Context_Req message as shown in Table 2.

Additional TLV type information that can be added in the negotiation process includes a data integrity capability TLV and a data integrity method (1), which is a sub-TLV of the data integrity capability TLV. These TLVs also can be included in the MAC Context_Req message transmitted in steps 314 and 316 as shown in Table 3 below. This information delivers all handover data integrity methods supportable by the target BS 310, information on whether the target BS 310 supports an ARQ, etc., to the serving BS 302.

TABLE 3

| IE |
| --- |
| BS Info<br>> Data Integrity Capability<br>  >>Data Integrity Method(1) |

As noted from Table 3, the data integrity capability information is sub-information of the BS information included in the form of TLV. Further, as sub-information of the data integrity capability information, the data integrity method (1) may be included in the form of TLV in the MAC Context_Req message.

The data Integrity Method TLV may be either the data integrity method (1), which is a sub-TLV of the data integrity capability TLV as shown in Table 3 or a data integrity method (2), which is a sub-TLV of the SF info TLV as shown in Table 4 below. The data integrity method (2) TLV includes information notifying of the method through which the handover data integrity function will be performed. The data integrity method (2) TLV is included in the MAC Context_Rpt message transmitted in steps 318 and 320 of FIG. 4 in the form of Table 4 below, and this data integrity method TLV may be included as a sub-TLV of the SF info.

That is, the data integrity method (2) TLV includes information on a handover data integrity method supported by the serving BS 302.

TABLE 4

| IE |
| --- |
| SF Info<br>> Data Integrity Method(2) |

Hereinafter, TLVs added to corresponding messages according to whether the MS 300 uses an ARQ scheme or a non ARQ scheme will be described.

First, TLVs added when the MS 300 uses an ARQ scheme include an ARQ window information (info) TLV for notifying information on the ARQ state, and a switching data path ID TLV for discriminating a handover data integrity path from an existing main data path.

The ARQ window information (info) TLV indicates information on the ARQ state forwarded to the MS 300. The ARQ window info TLV can be forwarded in the form of a sub-TLV of the SF information in order to notify the target BS 310 of the ARQ state information by the serving BS 302 when a handover occurs, and can be included in the MAC Context_Rpt message transmitted in steps 318 and 320 in the form as shown in Table 5 below.

TABLE 5

| IE |
| --- |
| SF Info<br>  > ARQ Window Info<br>    >> Starting ARQ BSN<br>    >> Last ARQ BSN<br>    >> Valid ARQ BSN (DL only)<br>    >> Reset Status |

As noted from Table 5, sub-TLVs of the ARQ window info TLV include a starting ARQ BSN TLV, a last ARQ BSN TLV, a valid ARQ BSN TLV, and a reset status TLV.

The switching data path ID TLV indicates a Genetic Routing Encapsulation (GRE) key for a handover data integrity path (buffer switching data path). That is, the switching data path ID TLV is a TLV for discriminating a handover data integrity path from an existing main data path and may be included in the Path_Reg_Req/Rsp messages transmitted in steps 332 and 342 in the form as shown in Table 6 below.

TABLE 6

| IE |
| --- |
| Data Path Info<br>> Switching Data Path ID |

As noted from Table 6, the switching data path ID TLV according to an exemplary embodiment of the present invention is included as a sub-TLV of the data path info TLV of the Path_Reg_Req/Rsp messages.

Further, TLVs added when the MS 300 uses a non-ARQ scheme include an SDU Sequence Number (SN) TLV. The SDU SN TLV is a TLV referring to the number of a first SDU which the target BS 310 initially transmits to the MS 300. The SN refers to a number given to each SDU in order to indicate a relative position of the SDU. For example, if the serving BS 302 has transmitted SDUs up to the $(SN-1)^{th}$ SDU, the target BS 310 notifies the target BS 310 that the target BS 310 can transmit the SDUs from the $SN^{th}$ SDU. The SDU SN TLV may be included as a sub-TLV of the SDU info TLV of the MAC Context_Rpt message transmitted in steps 318 and 320 of FIG. 4 in the form as shown in Table 7 below.

TABLE 7

| IE |
| --- |
| SDU Info<br>> SDU SN |

In the case of the controlled handover as described above with reference to FIG. 1, the handover data integrity process is started when a MOB_HO_IND message transmitted from an MS is received by the serving BS 102 and a main path is generated between the serving ASN-GW 104 and the target BS 106 (e.g., step 130 of FIG. 1). That is, it is started from the path pre-registration step. However, in a poor wireless environment, the MOB_HO_IND message may be lost while it is transmitted to the serving BS 102, so as to cause an uncontrolled handover.

In the case of an uncontrolled handover, the MOB_HO_IND message is lost and a path pre-registration is not performed before the ranging of the MS 300. Therefore, in the case of an uncontrolled handover, differently from the controlled handover, a handover data integrity path is generated simultaneously while a main data path is generated during a path registration step for generating the main data path between the serving ASN-GW 304 and the target BS 310 as in step 320 of FIG. 4, instead of the path pre-registration step. This is because the uncontrolled handover does not include a path pre-registration step, which implies that the time for establishing a handover data integrity path is absolutely insufficient. Therefore, in the case of an uncontrolled handover, a handover data integrity path is generated simultaneously while a main data path is generated, in order to reduce the time and prevent waste of repeated transmission of messages.

Thereafter, a handover data integrity path is also generated between the serving BS 302 and the serving ASN-GW 304 as in step 342 of FIG. 4, and the serving BS 302 forwards the buffered data to the target BS 310 through the generated handover data integrity path as in step 343.

Table 8 below shows differences between a method of generating a handover data integrity path in a controlled handover used in a WiMAX system and a method of generating a handover data integrity path in an uncontrolled handover proposed by exemplary embodiments of the present invention.

TABLE 8

| Controlled Handover | Uncontrolled handover |
| --- | --- |
| Generation of a handover data integrity path: a handover data integrity path is generated together with a main data path through exchange of path pre-registration request, response, & acknowledgment messages in a path pre-registration step for establishing the main data path between a target BS and an SN-GW | Generation of a handover data integrity path: a handover data integrity path is generated together with a main data path through exchange of path registration request, response, & acknowledgment messages in a path registration step for establishing the main data path between a target BS and an SN-GW |

As described above, although an uncontrolled handover in the WiMAX standards to which the present invention is applied does not support a handover data integrity function, exemplary embodiments of the present invention enable execution of a handover data integrity function even in an uncontrolled handover. Therefore, according to exemplary embodiments of the present invention, it is possible to deliver downlink data, which has been stored in a serving BS during an uncontrolled handover, to an MS through a target BS without a data loss. Further, even in the uplink, it is possible to maintain the ARQ state and thus reduce the transmission delay. Moreover, according to exemplary embodiments of the present invention, since a buffer switching method is used for the handover data integrity, it is possible to support the handover data integrity in the uplink also as well as the downlink.

The exemplary methods of the present invention can be implemented by a program and can be stored in a recording medium (CD ROM, RAM, floppy disc, hard disc, optical magnetic disc, flash memory, etc.) in a computer-readable form. However, such a program or process is obvious to one skilled in the art, so a detailed description thereof will not be given here.

While the invention has been shown and described with reference to certain exemplary embodiments thereof, it will be understood by those skilled in the art that various changes in form and details may be made therein without departing from the scope and spirit of the invention as defined by the appended claims and their equivalents.

The invention claimed is:

1. A method to perform handover data integrity by a target base station (BS), the method comprising:
   receiving, from a mobile station (MS), an initial access request message if a handover indication message is not received from the MS by a serving BS;
   transmitting, through a gateway, first information related to handover data integrity which is supported by the target BS, to the serving BS;
   receiving, through the gateway, second information related to handover data integrity which is supported by the serving BS based on the first information, from the serving BS; and
   determining a handover data integrity scheme from the second information;
   transmitting, to the serving BS, the handover data integrity scheme;
   performing, through the gateway, a negotiation to establish a data path with the serving BS based on the handover data integrity scheme.

2. The method of claim 1 further comprising:
   generating a first data path with the gateway based on a result of the negotiation; and
   generating a second data path with the serving BS based on the result of the negotiation by the gateway.

3. The method of claim 2, further comprising receiving handover data buffered in the serving BS through the first data path and the second data path from the serving BS.

4. The method of claim 1, wherein the determining of the handover data integrity scheme includes determining a buffer switching scheme.

5. The method of claim 1, wherein the performing of the negotiation further includes receiving information related to an automatic repeat request (ARQ) state for the MS from the serving BS.

6. The method of claim 1, wherein the performing of the negotiation includes:
   transmitting a message to the serving BS through the gateway requesting the setting of the data path; and
   setting the data path using a handover integrity scheme predetermined by the target BS and the serving BS.

7. A method to perform handover data integrity by a serving base station (BS), the method comprising:
   receiving, through a gateway, first information related to handover data integrity which is supported by a target BS, from the target BS;
   transmitting, through the gateway, second information related to handover data integrity which is supported by the serving BS based on the first information, to the target BS; and
   receiving a handover data integrity scheme, which has been determined based on the second information, from the target BS; and
   performing, through a gateway, a negotiation to establish a data path with a target BS if the serving BS does not receive a handover indication message from a mobile station (MS) based on the handover data integrity scheme.

8. The method of claim 7, further comprising:
generating a first data path with the gateway based on a result of the negotiation; and
generating a second data path with the target BS based on the result of the negotiation by the gateway, after the performing of the negotiation.

9. The method of claim 7, further comprising transmitting handover data buffered in the serving BS through the first data path and the second data path to the target BS.

10. The method of claim 7, wherein the determined handover data integrity scheme includes a buffer switching scheme.

11. The method of claim 7, wherein the performing of the negotiation further includes transmitting information related to an Automatic Repeat Request (ARQ) state for the MS to the target BS.

12. The method of claim 7, wherein the performing of the negotiation includes:
receiving a message from the target BS through the gateway requesting the setting of the data path; and
setting the data path using a handover integrity scheme predetermined by the target BS and the serving BS.

13. A target base station (BS) to perform an uncontrolled handover data integrity, the target BS comprising:
a receiver configured to:
receive an initial access request message from a mobile station (MS) if a handover indication message is not received from the MS, and
receive, through a gateway, second information related to handover data integrity which is supported by a serving BS based on first information related to handover data integrity which is supported by the target BS, from the serving BS;
a transmitter configured to:
transmit, through the gateway, the first information to the serving BS,
transmit a handover data integrity scheme determined from the second information to the serving BS; and
a controller configured to:
determine the handover data integrity scheme, and
perform a negotiation to establish a data path with the serving BS through the gateway based on the handover data integrity scheme.

14. The target BS of claim 13, wherein the controller is further configured to:
generate a first data path with the gateway based on a result of the negotiation, and
generate a second data path with the serving BS based on a result of the negotiation by the gateway.

15. The target BS of claim 14, wherein the receiver is further configured to receive handover data buffered in the serving BS through the first data path and the second data path from the serving BS.

16. The target BS of claim 13, wherein the determining of the handover data integrity scheme includes determining a buffer switching scheme.

17. The target BS of claim 13, wherein the controller is further configured to perform the negotiation by receiving information related to an Automatic Repeat Request (ARQ) state for the MS from the serving BS.

18. The target BS of claim 13,
wherein the transmitter is configured to transmit a message to the serving BS through the gateway requesting the setting of the data path, and
wherein the controller is further configured to set the data path using a handover integrity scheme predetermined by the target BS and the serving BS.

19. A serving base station (BS) to perform an uncontrolled handover data integrity, the serving BS comprising:
a receiver configured to:
receive, through a gateway, first information related to handover data integrity which is supported by a target BS, from the target BS, and
receive a handover data integrity scheme, which has been determined based on second information, from the target BS;
a transmitter configured to transmit, through the gateway, the second information related to handover data integrity which is supported by the serving BS based on the first information, to the target BS; and
a controller configured to perform a negotiation to establish a data path with the target BS through the gateway if the serving BS does not receive a handover indication message from a mobile station (MS) based on the handover data integrity scheme.

20. The serving BS of claim 19, wherein the controller is further configured to:
generate a first data path with the gateway based on a result of the negotiation, and
generate a second data path with the target BS based on a result of the negotiation by the gateway, after the performing of the negotiation.

21. The serving BS of claim 19,
wherein the transmitter is configured to transmit handover data buffered in the serving BS through the first data path and the second data path to the target BS.

22. The serving BS of claim 19, wherein the determined handover data integrity scheme includes a buffer switching scheme.

23. The serving BS of claim 19, wherein the transmitter is further configured to transmit information related to an automatic repeat request (ARQ) state for the MS to the target BS.

24. The serving BS of claim 19,
wherein the receiver is configured to receive a message from the target BS through the gateway requesting the setting of the data path, and
wherein the controller is further configured to set the data path using a handover integrity scheme predetermined by the target BS and the serving BS.

* * * * *